(No Model.)
A. W. MORGAN.
WATER STREET STOP COCK BOX.
No. 350,891. Patented Oct. 12, 1886.
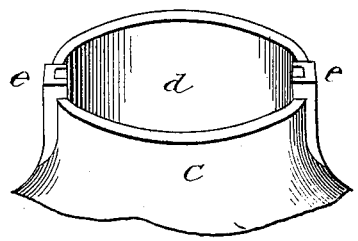
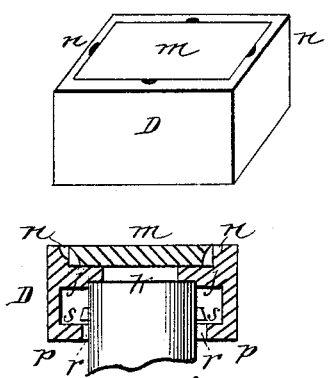
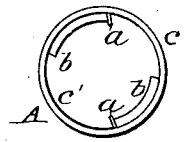
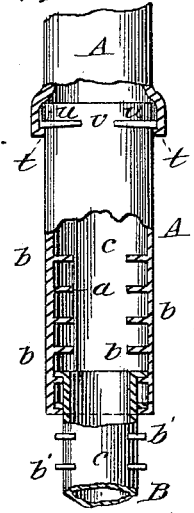
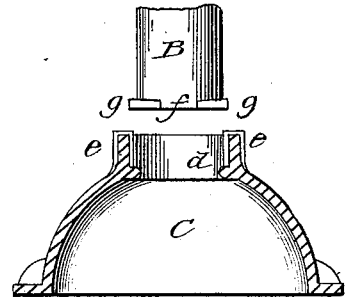
Witnesses:
Norris A. Clark.
J. R. Drake.
Amos W. Morgan, Inventor,
By his Attorney J. R. Drake.

UNITED STATES PATENT OFFICE.

AMOS W. MORGAN, OF BUFFALO, NEW YORK.

WATER STREET STOP-COCK BOX.

SPECIFICATION forming part of Letters Patent No. 350,891, dated October 12, 1886.

Application filed March 12, 1885. Serial No. 158,580. (No model.)

*To all whom it may concern:*

Be it known that I, AMOS W. MORGAN, a citizen of the United States, residing at Buffalo, in the county of Erie and State of New York, have invented certain new and useful Improvements in Gas and Water Street Stop-Cock Boxes, of which the following is a specification, reference being had therein to the accompanying drawings.

This improvement relates to gas and water street boxes, to lock together the outer and inner pipes, forming the box, at any desired height to bring the top or cover level with the street or walk. My patent of August 7, 1877, No. 193,827, accomplished this by constructing both pipes with a spiral screw-thread, one pipe turning on the other.

In the present invention the outer pipe or case has one or more vertical feathers or stops cast inside of the case, and a series of longitudinal segments or short rings also cast therein next the vertical stops, and the inner pipe has on its outside short longitudinal segmental rings or lugs to engage the rings inside the other pipe at any height desired.

The invention further consists in a new way of connecting the inner or main pipe with its base; also, in a rectangular cap or street level-box, removable and revolving on the top of the usual round pipe, so as to square with the Belgian or other square paving-blocks.

It also consists in a simple method of joining two lengths of pipe together so that they can be at once fastened or taken apart, all as hereinafter fully explained.

In the drawings, Figure 1 is an elevation of the device showing the square box in section, the connection of the two pipes or lengths, and the manner of joining the outer and inner pipes, the latter partly in section; Fig. 2, a perspective of the rectangular box; Fig. 3, a top plan of outer pipes showing the stops and segmental rings; Fig. 4, a portion of the inner pipe and the base and its means of connection, the latter in cross-section; Fig. 5, perspective of the upper part or neck of the base enlarged.

A and A' represent the outer case, the inside having cast therein two vertical stops or feathers, $a\ a$, and opposite each other, (see Figs. 1 and 3,) each projecting a little into the case. (See Fig. 3.) Next these are cast a series of longitudinal segments, $b\ b\ b$, to engage or interlock with similar short segments or lugs, $b'\ b'\ b'$, cast on the outside of the lower pipe, B, leaving a vertical space, $c$, between the two rows of rings, and similar spaces, $c'\ c'$, between the two rows of rings $b\ b\ b$, inside the case A, so that in connecting the two pipes the ring part of the case B slips up in spaces $c'\ c'$ of case or pipe A' until the exact height desired is reached. Then by a sharp turn of the upper case the rings interlock until stopped against the vertical feather $a$, which prevents turning the pipe too far and disengaging. They cannot then be separated unless turned backward, and when thus turned to raise or lower the pipe the rings then strike against the opposite feather $a$, thus giving a stop and also a guide to slide the pipe up or down by. By these simple means the "box" can be set to bring the top or cover to the street-level.

C is the separate base for pipe B to set in, and is made with an elongated neck or ring, $d$, having vertical lugs $e\ e$ cast inside, (or outside,) to set in spaces $f\ f$, between the segmental ring $g$ on the bottom of pipe B when the two are joined, the object being to get a vertical play of the pipe B in said long neck $d$, as it is found that when locked to the base, as in my previous patent, the frost in very cold places will heave and sometimes break the pipe or base. The lugs $e\ e$ prevent this by allowing a vertical play, but also prevent the pipe B from turning when being wedged together with pipe A. The pipe B can go over or in the neck of the base, and the lugs $e\ e$ may be on the pipe and the rings $g$ on the neck of the base, if desired, the effect being the same. There is a seat, $i$, in the bottom of the neck $d$ to prevent the pipe going through.

D is a rectangular surface box or cover setting on top of the round pipe A (made thus to conform to the shape of square stone blocks or bricks used for pavements in some places) in place of the usual round covers, which have to be filled around and "squared up." The pipe A enters the box D about half-way and strikes against an open circular shoulder, $j$, forming part of the box, leaving the central opening, $k$, therein. On this shoulder the box rests and is revolved to any angle to meet the squares of the pavement. The cover proper, m, is made either round or square, as desired, and sets on top of the shoulder j. A series of side openings, n n, are made in the cover and in the box to easily pry off the cover when desired. Below the shoulder j the box is hollow inside, and ends in a bottom, p, with a central opening for admission of the round pipe A, and one or more openings, r, are made in the bottom to admit a lug or lugs, s s, cast on the pipe, and when the box is swung around these prevent the box being lifted off until the lugs come to these openings.

In order to couple together suitable lengths of pipe, I joint them by enlarging the end of one pipe, A, (see Fig. 1,) and casting lugs t t at or near the end inside this enlargement, and on the other pipe, A', are cast two segmental locking-rings, u u, which are made inclined on the surface that strikes the lugs, and as the end of the pipe A' sets against the seat of the enlargement the two when turned are tightly locked together, as shown in Fig. 1. By turning either pipe until the opening v between the segments comes opposite the lugs t t the pipes are separated or fastened together. This is a very simple and effectual method of jointing long or short pipes and does away with the difficulty of casting very long pipes, (as in some places very long boxes are required,) longer than can be economically or safely cast in one length.

I claim—

1. In a street water and gas box, in combination with a round pipe, the rectangular top or cover D, having the shoulder j, the cover proper, m, the bottom p, with one or more lug-openings, r, therein, and the lugs s s on the entering round pipe, all arranged and operating substantially as and for the purpose specified.

2. In double or telescopic street water and gas boxes, the tube A', having the long vertical stop or stops a, and segments b b, formed thereon, in combination with the inner tube, B, having the segmental rings or lugs b' b', as and for the purpose specified.

3. In combination with the pipe B, having the bottom segmental ring, g, the base C, having the long neck d, provided with vertical lugs e e, substantially as and for the purpose specified.

In testimony whereof I affix my signature in presence of two witnesses.

AMOS W. MORGAN.

Witnesses:
J. R. DRAKE,
T. H. PARSONS.